United States Patent [19]

Higby

[11] Patent Number: 5,780,372
[45] Date of Patent: Jul. 14, 1998

[54] COLORED GLASS COMPOSITIONS

[75] Inventor: Paige L. Higby, Maumee, Ohio

[73] Assignee: Libbey-Owens-Ford Co., Toledo, Ohio

[21] Appl. No.: 781,428

[22] Filed: Jan. 10, 1997

[51] Int. Cl.[6] .................................................. C03C 3/087
[52] U.S. Cl. .................... 501/70; 501/71; 501/904; 501/905
[58] Field of Search ...................... 501/64, 68, 70, 501/71, 72, 904, 905

[56] References Cited

U.S. PATENT DOCUMENTS

| | | | |
|---|---|---|---|
| 4,792,336 | 12/1988 | Pecoraro et al. | 501/70 |
| 5,112,778 | 5/1992 | Cheng et al. | 501/70 |
| 5,240,886 | 8/1993 | Gulotta et al. | 501/70 |
| 5,478,783 | 12/1995 | Higby et al. | 501/27 |
| 5,521,128 | 5/1996 | Jones et al. | 501/27 |
| 5,545,596 | 8/1996 | Alvarez Casariego et al. | 501/71 |
| 5,582,455 | 12/1996 | Casariego et al. | 296/146.2 |
| 5,593,929 | 1/1997 | Krumwiede et al. | 501/70 |

FOREIGN PATENT DOCUMENTS

| | | |
|---|---|---|
| 60-215546 | 10/1985 | Japan. |
| 96097 | 3/1975 | Poland. |
| 94/18135 | 8/1994 | WIPO. |

OTHER PUBLICATIONS

R.C. Knupp, D.F. Berger, "Effects of Iron in Ultraviolet Absorbing Green Glass" The Glass Industry, pp. 252–257, May 1966.

*Primary Examiner*—Karl Group
*Attorney, Agent, or Firm*—Marshall & Melhorn

[57] ABSTRACT

A moderate visible light transmitting soda-lime-silica glass of a blue green tint having, at a nominal 4 mm thickness, a visible light transmittance of about 10% to about 70%, and a direct solar heat transmittance of at least 5% less than the visible light transmittance. The soda-lime-silica glass composition includes the essential ingredients of about 1 to about 3 weight percent $Fe_2O_3$, about 0.1 to about 1 weight percent $TiO_2$, and about 0 to 500 ppm $Co_3O_4$ with a ferrous iron to total iron content of about 10% to about 37% by weight.

16 Claims, No Drawings

COLORED GLASS COMPOSITIONS

BACKGROUND OF THE INVENTION

1. Field of the Invention

This application is claiming the benefit, under U.S.C. § 119(e), of the provisional application filed Feb. 21, 1996, under 35 U.S.C. § 111(b), which was granted a Ser. No. 60/011,982. The provisional application, Ser. No. 60/011,982, is hereby incorporated by reference.

This invention relates to a blue-green colored glass that has a moderate visible light transmittance, a reduced solar heat transmittance, and a reduced ultraviolet radiation transmittance. More particularly, this invention relates to a glass composition that utilizes colorants of iron oxide, titanium dioxide, and optionally cobalt oxide to produce a glass suitable for use in automotive and architectural glazings.

2. Summary of Related Art

A glass composition has been developed for use in glazings which has a reduced direct solar heat transmittance (DSHT) and a reduced ultraviolet radiation transmittance while permitting a desirable visible light transmittance. Although not limited to a particular use, the blue-green colored glass of the present invention exhibits a combination of properties that makes it highly desirable for use as sidelights or privacy glazings in automotive applications. The glass composition of the present invention reduces the problems caused by excessive heating on sunny days and permits a desirable amount of visible light to pass while maintaining a private setting with regards to the interior of the vehicle. Moreover, the blue-green color of the glass is aesthetically pleasing and desirable for sidelight applications. Additionally, the blue-green glasses of the present invention are for solar control applications in architectural glazings.

The glasses of the present invention have color co-ordinates, as defined in the CIELAB Illuminant C system, lying in the ranges a* from −20 to +7, b* from −10 to +20. The term "blue-green tint" is hereinafter used to describe glasses having such color co-ordinates. The present composition is compatible with conventional flat glass manufacturing methods.

It is generally known to manufacture heat or infrared radiation absorbing soda-lime-silica glass by the incorporation therein of iron. The iron is generally present in the glass as both ferrous oxide (FeO) and ferric oxide ($Fe_2O_3$). The balance between ferrous and ferric oxide has a direct and material effect on the color and transmittance properties of the glass. As the ferrous oxide content is increased (as a result of chemically reducing ferric oxide), the infrared absorption increases and the ultraviolet absorption decreases. The shift toward a higher concentration of FeO in relation to the $Fe_2O_3$ also causes a change in the color of the glass from a yellow or yellow-green to a darker green, which reduces the visible transmittance of the glass. Therefore, in order to obtain greater infrared absorption in glass without sacrificing visual transmittance, it has been deemed necessary in the prior art to produce glass with a low total iron content which is highly reduced from $Fe_2O_3$ to FeO. Additionally, high iron glass compositions were generally avoided in float glass processes because of anticipated melting problems with the raw materials caused by the high levels of iron.

It would be advantageous to produce a blue-green glass composition having a high iron content that provides a moderate visible light transmittance without deleteriously affecting the melting of the raw materials in a soda-lime-silica glass batch. The high iron levels and other essential colorants would provide a desirable blue-green glass composition having a moderate visible light transmittance.

It would also be an advantage to provide a blue-green colored glass composition that has a reduced direct solar heat transmittance and a reduced ultraviolet radiation transmittance while permitting a moderate level of visible light transmittance. A glass comprising those specific properties is ideally suited for privacy glazings in automotive applications. The blue-green color and the moderate visible light transmittance are desirable for sidelight applications. Furthermore, the reduced solar transmittance properties would prevent excessive heating on sunny days, and protect the interior plastic and fabric components of the automobile from the degradation caused by ultraviolet radiation.

SUMMARY OF THE INVENTION

According to the present invention, there is provided a moderate visible light transmitting soda-lime-silica glass of a blue-green tint (as herein defined) having, in a nominal 4 mm thickness, a visible light transmission of about 10% to about 70%, and a direct solar heat transmittance of at least 5% less than the visible light transmittance. Additionally, the glasses of the present invention have an ultraviolet radiation transmittance of less than 42%[1].

The soda-lime-silica glass composition of the present invention is tinted to a blue-green color by the inclusion of the essential ingredients of about 1 to about 3 weight percent $Fe_2O_3$, about 0.1 to about 1 weight percent $TiO_2$, and about 0 to 500 ppm $Co_3O_4$. Additionally, the ferrous iron to total iron content of the composition is about 10% to about 37% by weight (i.e., percent of total iron as ferrous iron (FeO) is between 10% and 37%[2]). Amounts of the colorants in the above ranges can produce beneficial effects on color purity, UV absorption, and solar heat transmittance without deleteriously influencing the unique and highly advantageous properties of the novel glass.

[1] Radiation transmittance results are based upon the following wavelength ranges:

| Ultraviolet | 300–400 | nanometers |
| Visible | 380–780 | nanometers |
| Total Solar | 300–2130 | nanometers |

[2] As is well known, the iron content in glasses is usually present in both the $Fe_2O_3$ (ferric) and FeO (ferrous) forms. As is conventional, the total amount of iron present in a glass is expressed herein as $Fe_2O_3$, regardless of the form actually present.

It is an objective of the present invention to provide a glass composition that results in a blue-green colored glass having a visible transmittance of about 10% to about 70%, a direct solar heat transmittance of at least 5% below the visible light transmittance, and an ultraviolet radiation transmittance of less than 42%. A glass composition with the noted properties is ideally suited for use as automotive and architectural glazings.

For the purpose of the present specification and claims, references to visible light transmittance are to light transmittance (LT) measured using the Illuminant A standard; UVT or ultraviolet radiation transmittance is an integrated term representing the area under the transmittance versus wavelength curve for wavelengths between 300 and 400 nm integrated at 5 nm intervals, using a trapezoidal integration method; and references to direct solar heat transmittance (DSHT) are references to solar heat transmittance integrated over the wavelength range 350 to 2100 nm according to the relative solar spectral distribution Parry Moon for air mass 2.

Unless otherwise noted, the term percent (%) as used herein and in the appended claims, means percent (%) by weight. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10}\frac{T_o}{T} \quad \begin{array}{l} (T_o = 100 \text{ minus estimated loss} \\ \text{loss from reflection} = 92; \\ T = \text{transmission at 1060 nm}) \end{array}$$

The optical density was then used to calculate the percent reduction:

$$\text{percent reduction} = \frac{(110) \times (\text{optical density})}{(\text{Glass thickness in mm}) \times (\text{wt \% total Fe}_2\text{O}_3)}$$

DETAILED DESCRIPTION OF THE PREFERRED EMBODIMENT

In automotive and architectural glass applications, it is often desirable to maintain a visible light transmittance level, for example between 10% to about 70%, to allow a moderate amount of visible light to pass while maintaining a degree of privacy for vehicle or building occupants. At the same time, it is advantageous to reduce the solar transmittance and ultraviolet radiation transmittance. The higher the solar transmittance, the higher the heat load will be inside the vehicle or building, and consequently the higher the load will be on air conditioning systems. Ultraviolet radiation is to be filtered out as much as possible in order to avoid, among other things, degradation of plastics or fabrics inside the vehicle or building.

The batch compositions of the present invention, when used to produce glass having a total glass thickness of about 4 mm, can exhibit an Illuminant A visible light transmittance value between about 10% to about 70% and a blue-green tint, as defined in the CIELAB Illuminant C two degree observer system, lying in the ranges a* from −20 to +7, b* from −10 to +20, and having an L* value greater than 32. Furthermore, the compositions result in a reduced direct solar heat transmittance of at least 5% below the visible light transmittance, preferably 10% below, and most preferably 20% below the visible light transmittance. The glass compositions produced in accordance with the present invention also have reduced ultraviolet radiation transmittance values of less than 42%. Additionally, the glass compositions of the present invention maintain a color purity of less than 22% and a dominant wavelength below 565 nm.

In a preferred embodiment, the glass compositions of the present invention have an Illuminant A visible light transmittance of about 15% to about 50%. Glass compositions with the noted properties are ideally suited for automotive sidelights or privacy glazings because they permit a moderate degree of visibility by individuals outside the vehicle while still maintaining a desirable level of privacy. Additionally, a glass composition in accordance with the present invention having over 2 weight percent $Fe_2O_3$, over 100 ppm $Co_3O_4$, and 0.1 to 1.0 weight percent $TiO_2$ can produce a finished glass which exhibits, at a nominal 4 mm thickness, an Illuminant A visible light transmittance of between 15–25% and an ultraviolet radiation transmittance of less than 5%. Such glasses are also desirable for automotive glazings.

The glass compositions of the present invention contain a conventional soda-lime-silica base glass having the essential colorants of 1 to 3 weight percent total iron, expressed as $Fe_2O_3$, about 0.1 to about 1.0 weight percent titanium dioxide, and about 0 to about 500 ppm cobalt oxide. Additionally, the ferrous iron to total iron content of the present composition is about 10% to about 37% by weight.

Suitable batch materials for producing glasses according to the present invention, which materials are compounded by conventional glass batch ingredient mixing devices, include sand, limestone, dolomite, soda ash, salt cake or gypsum, iron oxide and carbon. Additionally, conventional sources for the cobalt oxide and titanium dioxide colorants are suitable for use in the present glass composition. In a preferred embodiment of the present invention, the use of ilmenite as the source of titanium is particularly advantageous, supplying at least a partial amount of the $Fe_2O_3$ as well as titanium dioxide. Additionally, in accordance with the present invention the use of wuestite as the source of iron is particularly advantageous, supplying at least a partial amount or preferably all of the $Fe_2O_3$ and substantially eliminating the need for carbon.

These batch materials are conveniently melted together in a conventional glass making furnace, to form a blue-green colored infrared energy and ultraviolet radiation absorbing glass composition, which thereafter may be continuously cast onto the molten metal bath in a float glass process. The flat glass thus produced may be formed into architectural glazings, or cut and formed, such as for example by press bending and optionally tempered, to provide automotive glazings.

The composition of soda-lime-silica flat glasses suitable for use in accordance with the present invention typically have the following weight percentage constituents:

| | |
|---|---|
| $SiO_2$ | 60–80% |
| $Na_2O$ | 10–20 |
| CaO | 5–15 |
| BaO | 0–10 |
| MgO | 0–10 |
| $Al_2O_3$ | 0–5 |
| $K_2O$ | 0–5 |
| $B_2O_3$ | 0–5 |

Other minor ingredients, including melting and refining aids such as $SO_3$, may also appear in the glass composition. The coloring constituents of the present invention set forth above are added to this base glass. The glass is essentially free of colorants other than iron, titanium dioxide, and optionally cobalt oxide. However, trace amounts of other oxides may be present as impurities.

Accordingly, the glass of the present invention may be melted and refined in a conventional tank-type melting furnace and formed into flat glass sheets of varying thicknesses by the float method in which the molten glass is supported on a pool of molten metal, usually tin, as it assumes a ribbon shape and is cooled.

The glass compositions produced in accordance with the present invention are particularly suited for use as automotive and architectural glazings. The compositions provide a desirable blue-green color and moderate visible light transmittance while reducing the solar heat transmittance and the ultraviolet transmittance.

The field of tinted glasses is one in which relatively small changes can produce major changes in tint. Wide ranges disclosed in prior patents can encompass many possibilities, and it is only the teaching of the specific examples that can be relied on as identifying how particular tints associate with particular ranges of solar heat transmittance and ultraviolet radiation absorption.

The following examples in Table I illustrate glass compositions in accordance with the invention that are readily formed into blue-green colored glass articles or glazings. Each example includes a soda-lime-silica base glass composition prepared in accordance with the present invention. The specific colorant compositions are noted for each example. The resulting glass compositions have an Illuminant A visible light transmission of at least 10% and no greater than 70%, a direct solar energy transmittance of at least 5% below the visible light transmittance, and an ultraviolet radiation transmittance below 42%.

The examples illustrate but do not limit the invention. In the examples, all parts and percentages are by weight and:

(a) $Fe_2O_3$ and $TiO_2$ are expressed in percent;

(b) total iron is expressed as if all iron present were present as ferric oxide;

(c) $Co_3O_4$ is expressed in parts per million (ppm);

(d) the transmittance data in the Table below and throughout are based on a nominal glass thickness of 4 mm;

(e) % ferrous represents the degree of reduction of total iron.

TABLE I

| Ex. No. | wt % $Fe_2O_3$ | wt % $TiO_2$ | $Co_3O_4$ | % Ferrous | Visible Light Trans (Ill A) | DSHT |
|---|---|---|---|---|---|---|
| 1 | 1.0 | 0.5 | 90 | 24 | 50.2 | 33.4 |
| 2 | 1.3 | 0.6 | 108 | 22 | 48.9 | 31.0 |
| 3 | 1.3 | 0.8 | 65 | 17 | 52.2 | 34.6 |
| 4 | 1.4 | 0.5 | 30 | 28 | 49.4 | 25.1 |
| 5 | 1.4 | 0.9 | 20 | 29 | 48.2 | 23.2 |
| 6 | 1.4 | 0.7 | 26 | 27 | 46.4 | 22.6 |
| 7 | 1.7 | 0.4 | 0 | 26 | 50.1 | 23.7 |
| 8 | 1.6 | 0.4 | 0 | 28 | 48.8 | 22.7 |
| 9 | 2.1 | 0.1 | 0 | 13 | 54.8 | 30.3 |
| 10 | 2.1 | 0.5 | 0 | 15 | 52.4 | 28.0 |
| 11 | 3.0 | 0.5 | 0 | — | 12.8 | 5.6 |
| 12 | 1.2 | 0.5 | 0 | 17 | 68.5 | 41.8 |
| 13 | 2.6 | 0.5 | 136 | 37 | 18.1 | 8.6 |
| 14 | 2.5 | 0.5 | 134 | 27 | 19.4 | 9.6 |
| 15 | 2.5 | 0.6 | 157 | 27 | 17.8 | 8.9 |
| 16 | 2.6 | 0.5 | 162 | 26 | 15.3 | 7.5 |
| 17 | 2.5 | 0.5 | 149 | 30 | 16.2 | 7.6 |

| Ex. No. | $T_{UV}$ | $L^*$ | $a^*$ | $b^*$ | Dominant Wave-length | % Color Purity |
|---|---|---|---|---|---|---|
| 1 | 25.0 | 77.9 | −10.6 | −4.1 | 490 | 9.5 |
| 2 | 23.4 | 77.1 | −11.2 | −3.3 | 491 | 9.2 |
| 3 | 15.0 | 78.2 | −10.8 | 4.9 | 527 | 3.8 |
| 4 | 16.1 | 76.9 | −14.4 | 5.3 | 517 | 4.6 |
| 5 | 12.0 | 75.8 | −14.9 | 10.2 | 554 | 13.2 |
| 6 | 11.7 | 74.7 | −14.3 | 8.0 | 537 | 6.7 |
| 7 | 12.2 | 76.9 | −14.5 | 11.0 | 551 | 9.9 |
| 8 | 13.3 | 76.3 | −15.2 | 9.1 | 542 | 7.7 |
| 9 | 9.3 | 79.4 | −12.7 | 12.9 | 560 | 12.7 |
| 10 | 7.0 | 77.8 | −13.1 | 16.2 | 564 | 18.5 |
| 11 | 5.4 | 43.0 | −20.0 | 14.7 | 548 | 21.2 |
| 12 | 24.7 | 86.7 | −9.1 | 7.3 | 552 | 6.0 |
| 13 | 2.4 | 51.1 | −17.2 | 2.3 | 501 | 10.5 |
| 14 | 2.9 | 52.7 | −16.9 | 1.5 | 499 | 10.7 |
| 15 | 3.1 | 51.0 | −16.8 | −1.4 | 494 | 14.2 |
| 16 | 2.2 | 47.8 | −17.0 | −0.2 | 496 | 14.1 |
| 17 | 2.5 | 48.9 | −17.7 | 0.0 | 495 | 16.4 |

This description of the invention has been made with reference to specific examples, but it should be understood that variations and modifications as are known to those of skill in the art may be resorted to without departing from the scope of the present invention.

What is claimed is:

1. A soda-lime-silica glass having a base glass composition comprising on a weight percent basis: 60–80% $SiO_2$, 10–20% $Na_2O$, 5–15% CaO, 0–10% MgO, 0–5% $Al_2O_3$, 0–5% $K_2O$, 0–10% BaO, and 0–5% $B_2O_3$, and colorants consisting essentially of from about 1 to about 3 weight percent $Fe_2O_3$ (total iron), from about 0.1 to about 1.0 weight percent $TiO_2$, from about 0 to about 500 ppm $Cl_3O_4$, and having a ferrous value of about 10% to about 37%, said glass having an Illuminant A visible light transmittance of about 10% to about 70% at a nominal thickness of about 4 mm and a dominant wavelength below 565 nm.

2. A glass as defined in claim 1, wherein said glass has a blue-green tint as defined in the CIELAB Illuminant C color system, lying in the ranges of $a^*$ from −20 to +7, $b^*$ −10 to +20, and having an $L^*$ value greater than 32.

3. A glass as defined in claim 1, wherein said glass has a direct solar heat transmittance of at least 5% below the visible light transmittance.

4. A glass as defined in claim 1, wherein said glass has a direct solar heat transmittance of at least 10% below the visible light transmittance.

5. A glass as defined in claim 1, wherein said glass has a direct solar heat transmittance of at least 20% below the visible light transmittance.

6. A glass as defined in claim 1, wherein said glass has an Illuminant A visible light transmittance of between about 15% to about 50%.

7. A glass as defined in claim 1, wherein said glass has an ultraviolet radiation transmittance of less than 42%.

8. A glass as defined in claim 1, wherein said glass has a color purity of less than 22%.

9. A soda-lime-silica glass having a base glass composition comprising on a weight percent basis: 60–80% $SiO_2$, 10–20% $Na_2O$, 5–15% CaO, 0–10% MgO, 0–5% $Al_2O_3$, 0–5% $K_2O$, 0–10% BaO, and 0–5% $B_2O_3$, and colorants consisting essentially of from about 1 to about 3 weight percent $Fe_2O_3$ (total iron), from about 0.1 to about 1.0 weight percent $TiO_2$, from about 0 to about 500 ppm $Co_3O_4$, and having a ferrous value of about 10% to about 37%, said glass having an Illuminant A visible light transmittance of about 10% to about 70% and a direct solar heat transmittance of at least 5% below the visible light transmittance at a nominal thickness of about 4 mm and said glass having a dominant wavelength below 565 nm.

10. A glass as defined in claim 9, wherein said glass has a blue-green tint as defined in the CIELAB Illuminant C color system, lying in the ranges of $a^*$ from −20 to +7, $b^*$ −10 to +20, and having an $L^*$ value greater than 32.

11. A glass as defined in claim 9, wherein said glass has a direct solar heat transmittance of at least 10% below the visible light transmittance.

12. A glass as defined in claim 9, wherein said glass has a direct solar heat transmittance of at least 20% below the visible light transmittance.

13. A glass as defined in claim 9, wherein said glass has an Illuminant A visible light transmittance of between about 15% to about 50%.

14. A glass as defined in claim 9, wherein said glass has an ultraviolet radiation transmittance of less than 42%.

15. A glass as defined in claim 9, wherein said glass has a color purity of less than 22%.

16. A glass as defined in claim 9, wherein said colorants include greater than 2 weight percent $Fe_2O_3$ (total iron) and greater than 100 ppm $Co_3O_4$, said glass having an Illuminant A visible light transmittance of between 15% and 25% and an ultraviolet radiation transmittance of less than 5%.

* * * * *

UNITED STATES PATENT AND TRADEMARK OFFICE
CERTIFICATE OF CORRECTION

PATENT NO. : 5,780,372
DATED : July 14, 1998
INVENTOR(S) : Paige L. Higby

It is certified that error appears in the above-indentified patent and that said Letters Patent is hereby corrected as shown below:

COLUMN 6, LINE, 8 CHANGE "$CL_3O_4$" to --$Co_3O_4$--.

Signed and Sealed this

Nineteenth Day of October, 1999

Attest:

Attesting Officer

Q. TODD DICKINSON

Acting Commissioner of Patents and Trademarks